United States Patent
Li

(10) Patent No.: US 9,042,470 B2
(45) Date of Patent: May 26, 2015

(54) MEASUREMENT METHOD AND APPARATUS

(75) Inventor: Yan Li, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 0 days.

(21) Appl. No.: 14/127,957

(22) PCT Filed: Jun. 28, 2011

(86) PCT No.: PCT/CN2011/076533
§ 371 (c)(1),
(2), (4) Date: Feb. 18, 2014

(87) PCT Pub. No.: WO2013/000126
PCT Pub. Date: Jan. 3, 2013

(65) Prior Publication Data
US 2014/0153658 A1    Jun. 5, 2014

(51) Int. Cl.
H04L 27/28    (2006.01)
H04W 24/02    (2009.01)
H04L 27/26    (2006.01)
H04L 5/00    (2006.01)

(52) U.S. Cl.
CPC .......... *H04W 24/02* (2013.01); *H04L 27/2601* (2013.01); *H04L 5/00* (2013.01)
USPC ...................................................... 375/260

(58) Field of Classification Search
CPC ... H04L 27/26; H04L 27/2601; H04W 24/02; H04W 24/10
USPC ......... 375/130, 136, 148, 260, 295, 302, 316, 375/332
See application file for complete search history.

(56) References Cited

U.S. PATENT DOCUMENTS

| 6,625,197 | B1 | | 9/2003 | Lundby | |
| 7,076,002 | B1 | * | 7/2006 | Ramirez-Mireles et al. | 375/316 |
| 8,345,783 | B1 | * | 1/2013 | Ionescu et al. | 375/260 |
| 2001/0014086 | A1 | | 8/2001 | Jeong | |
| 2003/0152050 | A1 | * | 8/2003 | Mochizuki | 370/332 |
| 2004/0114674 | A1 | * | 6/2004 | Lotter et al. | 375/148 |
| 2004/0184513 | A1 | * | 9/2004 | Lundby et al. | 375/148 |

(Continued)

FOREIGN PATENT DOCUMENTS

| CN | 101001231 A | 7/2007 |
| CN | 101141429 A | 3/2008 |

(Continued)

OTHER PUBLICATIONS

International Search Report in international application No. PCT/CN2011/076533, mailed on Apr. 5, 2012.

(Continued)

*Primary Examiner* — Syed Haider
(74) *Attorney, Agent, or Firm* — Neifeld IP Law, PC

(57) ABSTRACT

The disclosure discloses a measurement method. The method includes: a conjugate multiplication operation is performed on reference signals corresponding to a subcarrier within adjacent time slots to remove phase interference of the reference signals; the reference signals from which the phase interference has been removed are descrambled; and all the descrambled reference signals are accumulated. The disclosure further provides a measurement apparatus. With the technical solution of the disclosure, the operation complexity of measurement can be reduced.

6 Claims, 2 Drawing Sheets

(56) References Cited

U.S. PATENT DOCUMENTS

| | | |
|---|---|---|
| 2006/0133456 A1 | 6/2006 | Ettorre |
| 2009/0080372 A1* | 3/2009 | Naka et al. .................. 370/328 |
| 2010/0128808 A1* | 5/2010 | Ro et al. ....................... 375/260 |

FOREIGN PATENT DOCUMENTS

| | | |
|---|---|---|
| CN | 101155156 A | 4/2008 |
| EP | 1109325 A2 | 6/2001 |
| WO | 0025439 A1 | 5/2000 |
| WO | 2004047328 A1 | 6/2004 |

OTHER PUBLICATIONS

English Translation of the Written Opinion of the International Search Authority in international application No. PCT/CN2011/076533, mailed on Apr. 5, 2012.

Supplementary European Search Report in European application number: 11868597.3, mailed on Mar. 23, 2015.

* cited by examiner

US 9,042,470 B2

MEASUREMENT METHOD AND APPARATUS

CROSS REFERENCE TO RELATED APPLICATIONS

This application is a national stage entry of PCT/CN2011/076533, filed Jun. 28, 2011, which published as WO 2013/000126 in a language other than English on Jan. 3, 2013.

TECHNICAL FIELD

The disclosure relates to a wireless communication system, and in particular to a measurement method and a measurement apparatus for a Long Term Evolution (LTE) system.

BACKGROUND

In a wireless communication system, in particular in cellular communications, measurement is very important for switching and reselection of a cell. Main contents of measure are qualities of a serving cell and an adjacent cell. The accuracy of measurement may be influenced due to frequency selective fading, Doppler frequency shift and the like of a channel. Furthermore, in a switching process, a User Equipment (UE) may receive signals from a plurality of cells at the same time, thereby causing very serious interference. For an LTE system, a measurement method in the related art has relatively high operation complexity. Therefore for the UE, reducing the operation complexity of the measurement is a problem to be solved.

SUMMARY

In view of this, the disclosure is intended to provide a measurement method and a measurement apparatus for an LTE system, so as to reduce the operation complexity of measurement.

To this end, technical solutions of the disclosure are implemented as follows.

A measurement method provided by the disclosure includes:

a conjugate multiplication operation is performed on reference signals corresponding to a subcarrier within adjacent time slots to remove phase interference of the reference signals;

the reference signals from which the phase interference has been removed are descrambled; and all the descrambled reference signals are accumulated.

In the method, the process that a conjugate multiplication operation is performed on reference signals corresponding to a subcarrier within adjacent time slots to remove phase interference of the reference signals may include:

a reference signal is selected from received signals within one of the adjacent time slots, and the conjugate multiplication operation is performed on a reference signal corresponding to the subcarrier within the other of the adjacent time slots and the selected reference signal to obtain $R(k)=R^*_{t+1,l}(k) \cdot R_{t,l}(k)$, where $R_{t,l}(k)$ represents a reference signal received on a k-th subcarrier in an l-th Orthogonal Frequency Division Multiplexing (OFDM) symbol within time slot t and $R^*_{t+1,l}(k)$ represents a conjugate signal of a reference signal received on the k-th subcarrier in the l-th OFDM symbol within time slot t+1.

In the method, the process that the reference signals from which the phase interference has been removed are descrambled may include:

a descrambling sequence $RS(k)=RS^*_{t,l}(k) \cdot RS_{t+1,l}(k)$ is constructed, where $RS^*_{t,l}(k)$ and $RS_{t+1,l}(k)$ represent a conjugate signal of a reference signal sent on a k-th subcarrier in an l-th symbol within time slot t and a reference signal sent on the k-th subcarrier in the l-th symbol within time slot t+1 by a base station respectively; and a reference signal R(k) from which the phase interference has been removed is multiplied by the descrambling sequence RS(k) to obtain $\hat{R}(k)=RS(k) \cdot R(k)$.

In the method, the process that all the descrambled reference signals are accumulated may include:

all the descrambled reference signals within a measurement bandwidth are accumulated to obtain $$\bar{R}(k) = \sum^{K} \hat{R}(k),$$

where K represents a number of all the descrambled reference signals within the measurement bandwidth in an OFDM symbol.

The disclosure further provides a measurement apparatus, which includes: a removing module, a descrambling module and an accumulation module, wherein the removing module is configured to perform a conjugate multiplication operation on reference signals corresponding to a subcarrier within adjacent time slots to remove phase interference of the reference signals;

the descrambling module is configured to descramble the reference signals from which the phase interference has been removed; and the accumulation module is configured to accumulate all the descrambled reference signals.

In the apparatus, the removing module may be configured to:

select a reference signal from received signals within one of the adjacent time slots, and perform the conjugate multiplication operation on a reference signal corresponding to the subcarrier within the other of the adjacent time slots and the selected reference signal to obtain $R(k)=R^*_{t+1,l}(k) \cdot R_{t,l}(k)$, where $R_{t,l}(k)$ represents a reference signal received on a k-th subcarrier in an l-th Orthogonal Frequency Division Multiplexing (OFDM) symbol within time slot t and $R^*_{t+1,l}(k)$ represents a conjugate signal of a reference signal received on the k-th subcarrier in the l-th OFDM symbol within time slot t+1.

In the apparatus, the descrambling module may be configured to:

construct a descrambling sequence $RS(k)=RS^*_{t,l}(k) \cdot RS_{t+1,l}(k)$, where $RS^*_{t,l}(k)$ and $RS_{t+1,l}(k)$ represent a conjugate signal of a reference signal sent on a k-th subcarrier in an l-th symbol within time slot t and a reference signal sent on the k-th subcarrier in the l-th symbol within time slot t+1 by a base station respectively; and multiply a reference signal R(k) from which the phase interference has been removed by the descrambling sequence RS(k) to obtain $\hat{R}(k)=RS(k) \cdot R(k)$.

In the apparatus, the accumulation module may be configured to:

accumulate all the descrambled reference signals within a measurement bandwidth to obtain $$\bar{R}(k) = \sum^{K} \hat{R}(k),$$

where K represents a number of all the descrambled reference signals within the measurement bandwidth in an OFDM symbol.

Through the measurement method and the measurement apparatus for the LTE system provided by the disclosure, a conjugate multiplication operation is performed on reference signals corresponding to a subcarrier within adjacent time slots to remove phase interference of the reference signals, the reference signals from which the phase interference has been removed are descrambled, and all the descrambled reference signals are accumulated. The disclosure further provides a measurement apparatus, so that the influence of noise on the reference signal can be eliminated. The descrambling method in the disclosure can greatly reduce the operation complexity of measurement while ensuring measurement performance. Furthermore, channel influence on the reference signal is eliminated at first and measurement is then performed in a descrambling way, so the method has a capability of resisting multipath interference, and the measurement performance may not be influenced even when there is a great Doppler frequency shift.

DETAILED DESCRIPTION

The basic idea of the disclosure is: a conjugate multiplication operation is performed on reference signals corresponding to a subcarrier within adjacent time slots to remove phase interference of the reference signals; the reference signals from which the phase interference has been removed are descrambled; and all the descrambled reference signals are accumulated.

The disclosure is further elaborated below with reference to the drawings and specific embodiments.

Figure 1:
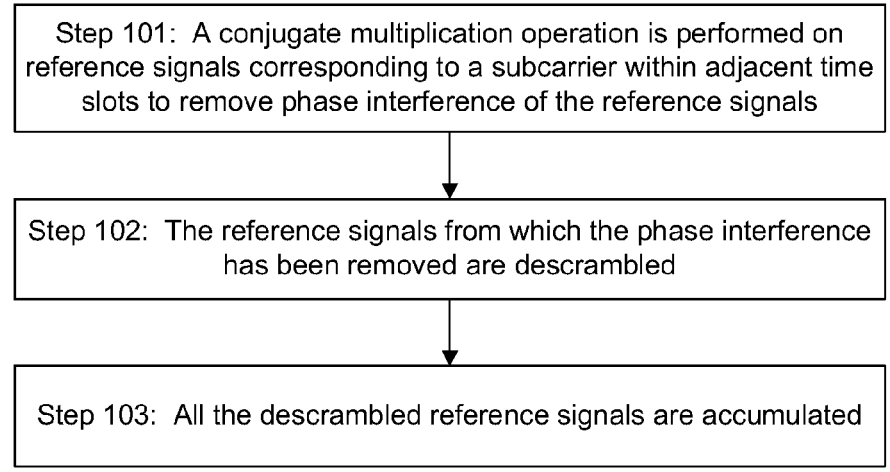
FIG. 1 is a diagram showing a flow of a measurement method of the disclosure.

The disclosure provides a measurement method for an LTE system. FIG. 1 is a diagram showing a flow of the measurement method of the disclosure. As shown in FIG. 1, the method includes:

Step 101: A conjugate multiplication operation is performed on reference signals corresponding to a subcarrier within adjacent time slots to remove phase interference of the reference signals.

Specifically, in the LTE system, a receiver receives signals from a base station and selects one or more Reference Signals (RSs) needing to be measured from the received signals. Since the received reference signals include an original reference signal and channel information sent by the base station, it is necessary to remove phase interference of the received reference signals, namely, multiplying the conjugate signal of a reference signal corresponding to a subcarrier in an adjacent time slot of the reference signal by the reference signal, to obtain $R(k)=R^*_{t+1,l}(k) \cdot R_{t,l}(k)$.

Figure 2:
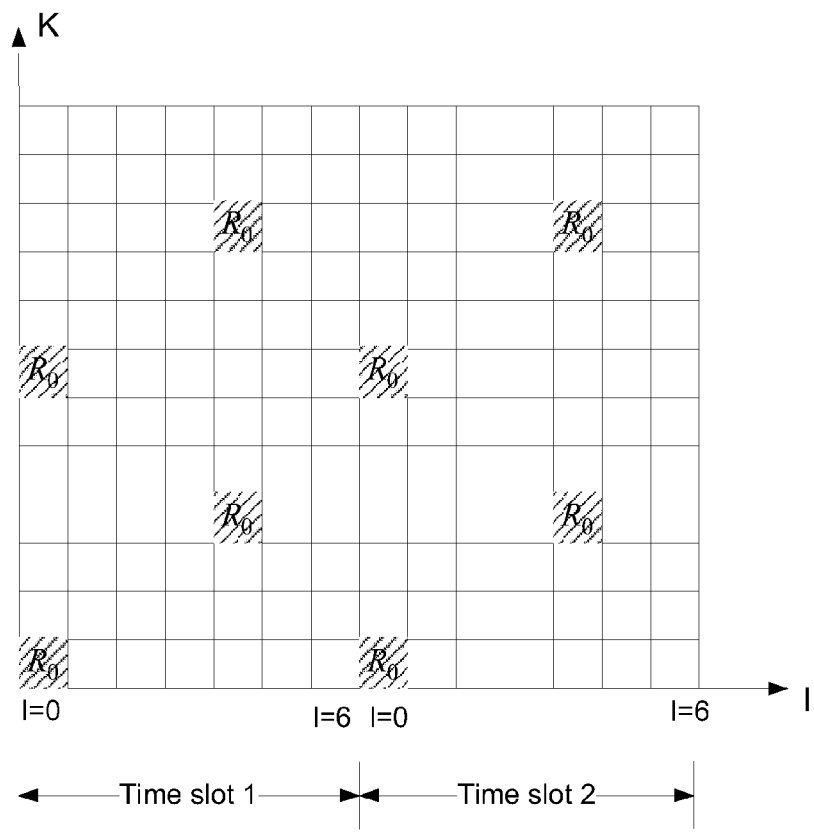
FIG. 2 is a diagram showing reference signal mapping in an LTE system in the disclosure.

As shown in FIG. 2, $R_{t,l}(k)$ represents a reference signal received on a k-th subcarrier in an l-th OFDM symbol within time slot t, and $R^*_{t+1,l}(k)$ represents the conjugate signal of a reference signal received on the k-th subcarrier in the l-th OFDM symbol within time slot t+1. For example, as shown in FIG. 2, the reference signal corresponding to the coordinates (l=0, k=0) in time slot 1 is the selected reference signal, and the reference signal corresponding to the coordinates (l=0, k=0) in time slot 2 is the conjugate signal corresponding to the selected reference signal. Alternatively, the reference signal corresponding to the coordinates (l=0, k=6) in time slot 1 is the selected reference signal, and the reference signal corresponding to the coordinates (l=0, k=6) in time slot 2 is the conjugate signal corresponding to the selected reference signal.

Step 102: The reference signals from which the phase interference has been removed are descrambled.

Specifically, the receiver constructs a new descrambling sequence $RS(k)=RS^*_{t,l}(k) \cdot RS_{t+1,l}(k)$, where $RS^*_{t,l}(k)$ and $RS_{t+1,l}(k)$ represent the conjugate signal of the reference signal sent on the k-th subcarrier in the l-th symbol within time slot t and the reference signal sent on the k-th subcarrier in the l-th symbol within time slot t+1 by the base station respectively. According to the characteristics of the original reference signal of LTE, only four values of 1, −1, j and −j occur in the descrambling sequence RS(k).

The receiver descrambles the reference signal R(k), from which the phase interference has been removed, through the descrambling sequence RS(k), namely, multiplying the reference signal R(k), from which the phase interference has been removed, by the descrambling sequence RS(k) to obtain $\hat{R}(k)=RS(k) \cdot R(k)$. Only four values of 1, −1, j and −j occur in the descrambling sequence RS(k), so that the descrambling is only to change the symbol of the reference signal and needs no actual multiplication operation, thereby greatly reducing the operation complexity.

Step 103: All the descrambled reference signals are accumulated.

Specifically, the receiver accumulates all the descrambled reference signals within the measurement bandwidth to obtain $$\overline{R}(k) = \sum_{}^{K} \hat{R}(k),$$

where K represents the number of all the descrambled reference signals within the measurement bandwidth in an OFDM symbol. So far, measurement of the reference signals is completed. Here, the accumulation of all the descrambled reference signals can improve a signal to noise ratio and remove noise.

Figure 3:
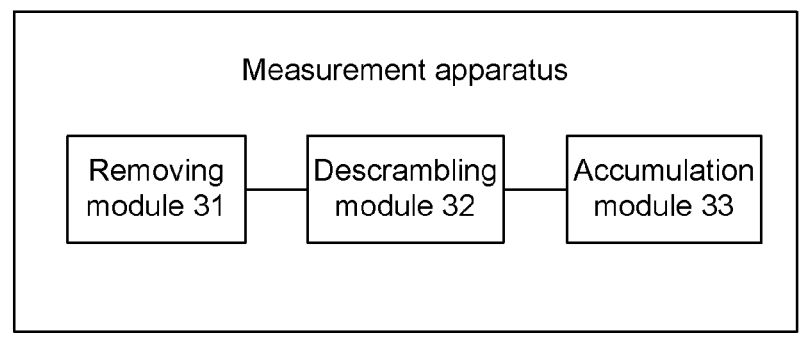
FIG. 3 is a diagram showing a structure of a measurement apparatus of the disclosure.

To implement the above method, the disclosure further provides a measurement apparatus for an LTE system. FIG. 3 is a diagram showing a structure of the measurement apparatus of the disclosure. The measurement apparatus can be applied to a signal receiver in the LTE system. As shown in FIG. 3, the apparatus includes: a removing module 31, a descrambling module 32 and an accumulation module 33.

The removing module 31 is configured to perform a conjugate multiplication operation on reference signals corresponding to a subcarrier within adjacent time slots to remove phase interference of the reference signals.

The descrambling module 32 is configured to descramble the reference signals from which the phase interference has been removed.

The accumulation module 33 is configured to accumulate all the descrambled reference signals.

The removing module 31 is configured to: select a reference signal from received signals within one of the adjacent time slots, and perform the conjugate multiplication operation on a reference signal corresponding to the subcarrier within the other of the adjacent time slots and the selected reference signal to obtain $R(k)=R^*_{t+1,l}(k) \cdot R_{t,l}(k)$, where $R_{t,l}(k)$ represents a reference signal received on a k-th subcarrier in an l-th Orthogonal Frequency Division Multiplexing (OFDM) symbol within time slot t and $R^*_{t+1,l}(k)$ represents a conjugate signal of a reference signal received on the k-th subcarrier in the l-th OFDM symbol within time slot t+1.

The descrambling module 32 is configured to: construct a descrambling sequence $RS(k)=RS^*_{t,l}(k) \cdot RS_{t+1,l}(k)$, where $RS^*_{t,l}(k)$ and $RS_{t+1,l}(k)$ represent a conjugate signal of a reference signal sent on a k-th subcarrier in an l-th symbol within time slot t and a reference signal sent on the k-th subcarrier in the l-th symbol within time slot t+1 by a base station respectively; and multiply a reference signal R(k) from which the phase interference has been removed by the descrambling sequence RS(k) to obtain $\hat{R}(k)=RS(k) \cdot R(k)$.

The accumulation module 33 is configured to: accumulate all the descrambled reference signals within a measurement bandwidth to obtain $$\bar{R}(k) = \sum^{K} R(k),$$

where K represents a number of all the descrambled reference signals within the measurement bandwidth in an OFDM symbol.

The above are only preferable embodiments of the disclosure, and are not intended to limit the scope of protection of the claims of the disclosure. Any modifications, equivalent substitutions, improvements or the like made within the concept and principle of the disclosure shall fall within the scope of protection of the claims of the disclosure.

The invention claimed is:

1. A measurement method in a receiver, comprising:
   performing, by a remover, a conjugate multiplication operation on reference signals received at the receiver from a base station corresponding to a subcarrier within adjacent time slots to remove phase interference of the reference signals;
   descrambling, by a descrambler, the reference signals from which the phase interference has been removed; and
   accumulating, by an accumulator, all the descrambled reference signals;
   wherein the descrambling the reference signals from which the phase interference has been removed comprises:
      constructing, by the descrambler, a descramblinq sequence $RS(k)=RS^*_{t,l}(k) \cdot RS_{t+1,l}(k)$, where $RS^*_{t,l}(k)$ and $RS_{t+1,l}(k)$ represent a conjugate signal of a reference signal sent on a k-th subcarrier in an l-th symbol within time slot t and a reference signal sent on the k-th subcarrier in the l-th symbol within time slot t+1 by the base station respectively; and
      multiplying a reference signal R(k) from which the phase interference has been removed by the descrambling sequence RS(k) to obtain $\hat{R}(k)=RS(k) \cdot R(k)$.

2. The method according to claim 1, where the performing a conjugate multiplication operation on reference signals corresponding to a subcarrier within adjacent time slots to remove phase interference of the reference signals comprises:
   selecting a reference signal from received signals within one of the adjacent time slots, and performing the conjugate multiplication operation on a reference signal corresponding to the subcarrier within the other of the adjacent time slots and the selected reference signal to obtain $R(k)=R^*_{t+1,l}(k) \cdot R_{t,l}(k)$, where $R_{t,l}(k)$ represents a reference signal received on a k-th subcarrier in an l-th Orthogonal Frequency Division Multiplexing (OFDM) symbol within time slot t and $R^*_{t+1,l}(k)$ represents a conjugate signal of a reference signal received on the k-th subcarrier in the l-th OFDM symbol within time slot t+1.

3. The method according to claim 1, wherein the accumulating all the descrambled reference signals comprises:
   accumulating all the descrambled reference signals within a measurement bandwidth to obtain $$\bar{R}(k) = \sum^{K} R(k),$$

where K represents a number of all the descrambled reference signals within the measurement bandwidth in an OFDM symbol.

4. A measurement apparatus in a receiver, comprising:
   a remover, a descrambler and an accumulator, wherein
   the remover is configured to perform a conjugate multiplication operation on reference signals received at the receiver from a base station corresponding to a subcarrier within adjacent time slots to remove phase interference of the reference signals;
   the descrambler is configured to descramble the reference signals from which the phase interference has been removed; and
   the accumulator is configured to accumulate all the descrambled reference signals;
   wherein the descrambler is further configured to construct a descrambling sequence $RS(k)=RS^*_{t,l}(k) \cdot RS_{t+1,l}(k)$, where $RS^*_{t,l}(k)$ and $RS_{t+1,l}(k)$ represent a conjugate signal of a reference signal sent on a k-th subcarrier in an l-th symbol within time slot t and a reference signal sent on the k-th subcarrier in the l-th symbol within time slot t+1 by the base station respectively; and
   multiply a reference signal R(k) from which the phase interference has been removed by the descrambling sequence RS(k) to obtain $\hat{R}(k)=RS(k) \cdot R(k)$.

5. The apparatus according to claim 4, wherein the remover is configured to:
   select a reference signal from received signals within one of the adjacent time slots, and perform the conjugate multiplication operation on a reference signal corresponding to the subcarrier within the other of the adjacent time slots and the selected reference signal to obtain $R(k)=R^*_{t+1,l}(k) \cdot R_{t,l}(k)$, where $R_{t,l}(k)$ represents a reference signal received on a k-th subcarrier in an l-th Orthogonal Frequency Division Multiplexing (OFDM) symbol within time slot t and $R^*_{t+1,l}(k)$ represents a conjugate signal of a reference signal received on the k-th subcarrier in the l-th OFDM symbol within time slot t+1.

6. The apparatus according to claim 4, wherein the accumulator module is configured to:
   accumulate all the descrambled reference signals within a measurement bandwidth to obtain $$\bar{R}(k) = \sum^{K} R(k),$$

where K represents a number of all the descrambled reference signals within the measurement bandwidth in an OFDM symbol.

* * * * *